Sept. 3, 1935. F. R. CLARK 2,013,601
VENTILATING MEANS FOR AUTOMOBILES
Filed May 2, 1933
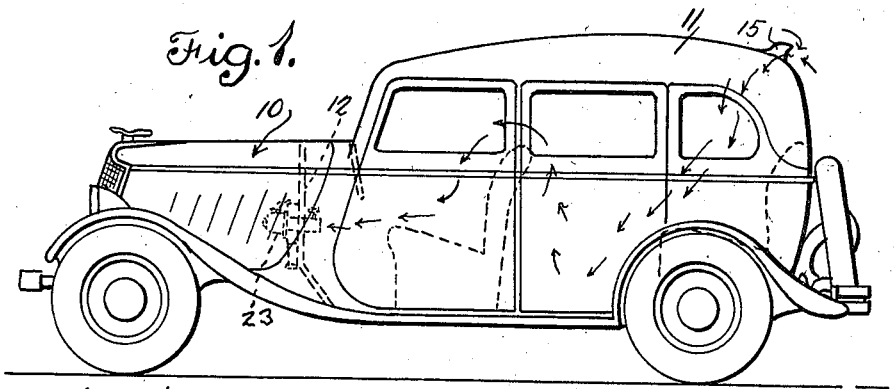
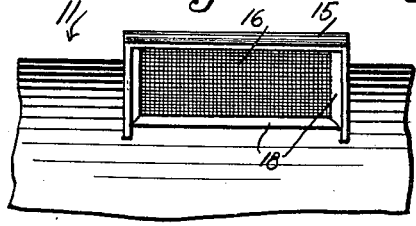
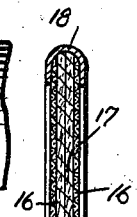
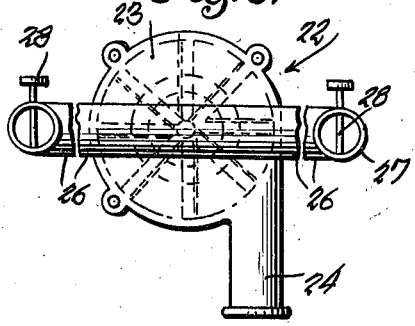
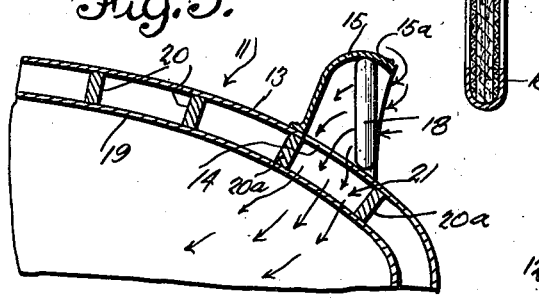
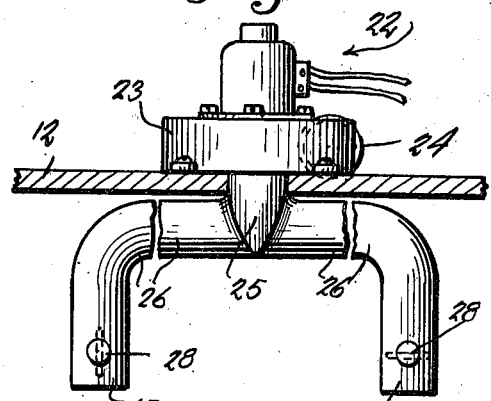
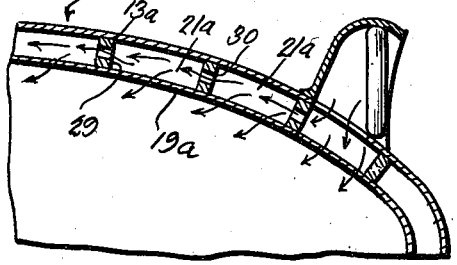
Inventor
F. R. Clark.

Patented Sept. 3, 1935

2,013,601

UNITED STATES PATENT OFFICE 2,013,601

VENTILATING MEANS FOR AUTOMOBILES

Frank R. Clark, Berwick, Pa.

Application May 2, 1933, Serial No. 669,016

1 Claim. (Cl. 98—2)

This invention relates to certain new and useful improvements in ventilating means for automobiles.

The primary object of the invention is to provide a system of ventilation for automobiles of the sedan or closed type wherein fresh air is admitted to the closed body of the automobile and air exhausted from the closed body in the absence of draft or air current to obtain perfect ventilation or change of air within the body.

A further object of the invention is to provide ventilating means for automobiles of the foregoing character wherein the fabric lining of the automobile top is employed as a baffle for air current to eliminate draft in the car body when the device for exhausting air from the body is in operation.

A still further object of the invention is to provide automobile ventilating means wherein a fan suction device and blower is carried by the dash board of the automobile for exhausting air from the automobile body, the suction device and blower being arranged in proximity of the internal combustion engine of the automobile so that air exhausted from the automobile body may be directed toward the engine for cooling purposes or the like.

A still further object of the invention is to provide an improved type of filter for air entering the automobile body that may be conveniently located at any point with respect to the top of the automobile for the admission of clean air to the automobile body, the screen or filter device comprising screen and fabric elements for the perfect filtering of air to be delivered to the body.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of an automobile of the sedan or closed type equipped with the improved ventilating means;

Figure 2 is a fragmentary rear elevational view of the automobile showing the screen air filter inlet for the automobile body;

Figure 3 is a longitudinal fragmentary sectional view of a part of the automobile top showing the mounting of the screened air filter inlet and illustrating by arrow lines the flow of air through a restricted area of the fabric lining of the automobile top;

Figure 4 is a cross-sectional view of the air filter screen;

Figure 5 is an elevational view of a motor operated fan having valve controlled inlets for exhausting air from the interior of the automobile body;

Figure 6 is a top plan view of the motor fan with the dash board support shown in section; and Figure 7 is a fragmentary longitudinal sectional view similar to Figure 3, showing perforated struts in the top of the body permitting filtered air to pass through a larger area of the top lining.

The invention relating to the ventilation of closed bodies of automobiles, provision is made for exhausting air from the closed body and admitting filtered air thereto in the absence of draft or air current and to accomplish these objects, there is illustrated in the accompanying drawing an automobile 10 of the closed type including the top 11 and dash board 12 with which the ventilating means is associated. While the ventilating means is illustrated as attached to and forming a part of the top 11 at its upper rear end, it is to be understood that the same may be associated with any part of the top 11 found desirable in different types of closed automobiles. The top 11 as shown in detail in Figure 3 includes the usual water-proof covering 13 having a slotted opening 14 therein protected from the elements by a raised arched hood 15 and an air ventilating device is confined within the hood 15 as illustrated.

As shown in detail in Figure 4, the air ventilating device includes a panel formed of comparatively fine mesh screens 16 separated by layers of felt or fabric 17, the edges of the screen and fabric layers 16 and 17 being bound by channel rims 18. The ventilator panel is confined in any preferred manner within the arched hood 15 with the free edge 15a of the hood overhanging the ventilator panel for protection thereof.

The usual construction of an automobile top 11 comprises the water-proof covering sheet 13 and a fabric lining 19 spaced therefrom by spaced reinforcing top struts 20, the opening 14 in the top covering 13 being in communication with the pocket 21 in the top between two top struts 20a as shown in Figure 3, thereby providing a restricted area in the top 11 of the automobile through which clean filtered air flows.

The system of ventilation also includes a motor operated fan 22 supported on the dash board 12 of the automobile 10, the fan including a casing 23 with an outlet 24 disposed at the forward side of the dash board 12 in proximity of the engine of the automobile, while the inlet 25 to the motor fan casing 23 projects rearwardly through the dash board 12 interiorly of the body of the automobile and carries branch pipes 26, the inlet ends 27 of which are valve controlled as at 28. The motor operated fan 22 is of a character requiring a minimum of consumption of energy and is to be operated by the usual storage battery for the automobile. Also, the exhaust 24 in the fan casing 23 may be directed toward the engine of the automobile with the exhaust air utilized as a cooling medium for the engine. It is also possible to attach the hose or the like to the exhaust 24 to use the same as a blower for any purpose desired.

When the motor operated fan 22 is in operation and one or both valves 28 are open, air is exhausted from within the body of the automobile 10 and a fresh supply of filtered air enters the body through the ventilator panel as shown by the arrow lines in Figures 1 and 3. The air is filtered in being passed through the ventilator panel, a further filtering being accomplished by its flow from the pocket 21 in the top 11 through the lining 19 of the top, the lining 19 constituting an effective baffle for air current to eliminate the possibility of all draft so that with the motor operated fan in operation, there is a continual change of air within the body of the automobile for the health and comfort of the occupants. The branch pipes 26 leading to the fan casing may be placed at any point desired or as many of these branch pipes may be employed to accomplish a complete change of air within the automobile body for the thorough ventilation thereof. The body of the car may be tightly closed in warm rainy weather or in passing over dusty highways without the least discomfort to the occupant, the ventilating system providing a fresh supply of air in a filtered condition to the body of the automobile.

In the form of invention illustrated in Figure 7, the top 11a of the automobile is illustrated as having the struts 29 perforated as at 30 so that air entering the pocket 21a between the covering 13a and lining 19a may flow over a greater area for passage through a greater area of the lining 19a.

From the above detailed description of the invention, it is believed that the construction and operation thereof will at once be apparent, it being understood that the part 11 herein referred to as the automobile top is intended to refer to any part of the automobile above the usual metal sides of the automobile body and the air inlet part of the ventilating means may as well be carried by the sides of the automobile or the rear part thereof in which the usual rear window is set, and while there are herein shown and described the preferred embodiments of the invention, it is nevertheless to be understood that minor changes may be made therein without departing from the spirit and scope of the invention as claimed.

I claim:—

In ventilating means of the character described, a closed automobile having a top provided with an opening therein at the rear, a hood rising from the top and overlying the opening, an air filter confined within the hood above and spaced rearwardly of the opening, the filter extending across the rear open side of the hood and a fan carried by the forward part of the automobile for drawing air through the filter device into the automobile and exhausting the air in the automobile through the front end thereof a casing for the fan and spaced branch pipes extending from the fan and casing into the automobile and having means controlling the inlets thereof.

FRANK R. CLARK.